United States Patent
Chen (10) Patent No.: US 12,470,313 B2
(45) Date of Patent: Nov. 11, 2025

(54) TIMESTAMPING ETHERNET PHYSICAL LAYER (PHY) FRAMES

(71) Applicant: Aeonsemi, Inc., Grand Cayman (KY)

(72) Inventor: Xi Chen, Fremont, CA (US)

(73) Assignee: Aeonsemi, Inc., Grand Cayman (KY)

( * ) Notice: Subject to any disclaimer, the term of this patent is extended or adjusted under 35 U.S.C. 154(b) by 424 days.

(21) Appl. No.: 18/149,619

(22) Filed: Jan. 3, 2023

(65) Prior Publication Data

US 2024/0223296 A1    Jul. 4, 2024

(51) Int. Cl.
  *H04J 3/06*    (2006.01)
  *G06F 12/123*  (2016.01)

(52) U.S. Cl.
  CPC .......... *H04J 3/0667* (2013.01); *G06F 12/123* (2013.01); *H04J 3/0682* (2013.01); *G06F 2212/154* (2013.01)

(58) Field of Classification Search
  CPC ...... H04J 3/0667; H04J 3/0682; G06F 12/123
  USPC ........................................................ 370/503
  See application file for complete search history.

(56) References Cited

U.S. PATENT DOCUMENTS

| | | | |
|---|---|---|---|
| 2014/0092918 A1* | 4/2014 | Jost | H04J 3/0661 370/465 |
| 2016/0043823 A1* | 2/2016 | Zhao | H04J 3/0697 370/350 |
| 2019/0273571 A1* | 9/2019 | Bordogna | H04J 3/0661 |
| 2021/0203428 A1* | 7/2021 | Bordogna | H04J 3/0697 |
| 2022/0021513 A1* | 1/2022 | Chen | H04L 7/0041 |

* cited by examiner

Primary Examiner — Faisal Choudhury
(74) Attorney, Agent, or Firm — Paradice & Li LLP (57) ABSTRACT

This disclosure provides methods, devices, and systems for timestamping Ethernet packets. The present implementations more specifically relate to capturing timestamps in the same clock domain as a media-dependent interface (MDI). In some aspects, a physical layer (PHY) transceiver may generate a receive (RX) timestamp for a precision time protocol (PTP) packet based on a time at which a physical medium attachment (PMA) sublayer outputs, to a physical coding sublayer (PCS), one or more PHY frames carrying the PTP packet. In some other aspects, a PHY transceiver may generate a transmit (TX) timestamp for a PTP packet based on a time at which a PCS outputs a reference frame to a PMA sublayer, where the reference frame precedes one or more PHY frames carrying the PTP packet.

11 Claims, 9 Drawing Sheets

TIMESTAMPING ETHERNET PHYSICAL LAYER (PHY) FRAMES

TECHNICAL FIELD

The present implementations relate generally to Ethernet communications, and specifically to timestamping Ethernet physical layer (PHY) frames.

BACKGROUND OF RELATED ART

The Institute of Electrical and Electronics Engineers (IEEE) 802.3 family of standards define a set of wired communication protocols referred to as "Ethernet." Ethernet technologies form the backbone of many communication networks (such as local area networks (LANs), metropolitan area networks (MANs), and wide area networks (WANs), among other examples). Devices in a network may communicate with one another by transmitting and receiving Ethernet frames. Many applications require timing information to be conveyed in Ethernet frames exchanged between a transmitting device and a receiving device. To facilitate the exchange of timing information, the transmitting device and the receiving device must be synchronized to the same reference clock. Some existing clock synchronization techniques (such as network time protocol (NTP) and global positioning system (GPS)) rely on a reference clock that is external to the network within which the transmitting device and the receiving device reside. However, some Ethernet devices do not support communication with an NTP server or GPS satellite.

The IEEE 1588 standard defines a clock synchronization protocol (also referred to as the "Precision Time Protocol" (PTP)) that allows one or more devices in a network (also referred to as "slave devices") to synchronize their clocks with another device in the network (also referred to as the "master device"). More specifically, the master device in a PTP system maintains a master clock and each slave device in the PTP system synchronizes its local (slave) clock to the master clock through an exchange of PTP packets. Each PTP packet is timestamped at the time of transmission (by the transmitting device) and at the time of reception (by the receiving device). A slave device can calculate a round-trip-time (RTT) of the PTP packets in the network based on the recorded timestamps and can further estimate an offset of its slave clock relative to the master clock based on the RTT. Thus, the accuracy of clock synchronization depends on how precisely the timestamps are captured during the transmission and reception of PTP packets.

A transmit (TX) timestamp indicates a time at which a PTP packet is transmitted on a communication medium (such as a twisted-pair cable) by a digital-to-analog converter (DAC), and a receive (RX) timestamp indicates a time at which a PTP packet is received on the medium by an analog-to-digital converter (ADC). TX timestamps can be captured in the physical layer (PHY), prior to encoding and scrambling the PTP packets, and adjusted to account for processing delays associated with the encoding and scrambling operations. RX timestamps can be captured in the PHY, after decoding and descrambling the PTP packets, and adjusted to account for processing delays associated with the decoding and descrambling operations. In existing PTP systems, TX and RX timestamps are adjusted by a predetermined offset representing an estimated delay between a media-independent interface (MII) and a media-dependent interface (MDI). However, such predetermined offsets are often inaccurate and cannot precisely account for actual delays experienced by each PTP packet. Thus, as Ethernet speeds continue to increase, new timestamping techniques are needed to support PTP clock synchronization.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method for timestamping packets by a timing synchronization controller of a communication device. The method includes steps of acquiring timing information indicating a time at which a physical coding sublayer (PCS) of the communication device outputs a first frame to a physical medium attachment (PMA) sublayer of the communication device; determining a delay between the first frame and a packet having a preamble followed by a start frame delimiter (SFD); generating a timestamp based at least in part on the timing information and the delay between the first frame and the packet; and inserting the timestamp into the packet.

Another innovative aspect of the subject matter of this disclosure can be implemented in a timing synchronization controller for a communication device, where the timing synchronization controller includes a processing system and a memory. The memory stores instructions that, when executed by the processing system, cause the timing synchronization controller to acquire timing information indicating a time at which a PCS of the communication device outputs a first frame to a PMA sublayer of the communication device; determine a delay between the first frame and a packet having a preamble followed by an SFD; generate a timestamp based at least in part on the timing information and the delay between the first frame and the packet; and insert the timestamp into the packet.

Another innovative aspect of the subject matter of this disclosure can be implemented in a method for timestamping packets by a timing synchronization controller of a communication device. The method includes steps of detecting a first frame of one or more frames output by a PMA sublayer of the communication device to a PCS of the communication device; generating a timestamp responsive to detecting the first frame, where the timestamp indicates a time at which the PMA sublayer outputs the first frame to the PCS; and adjusting the timestamp based at least in part on a packet recovered by the PCS from the one or more frames, where the packet includes a preamble followed by an SFD.

Another innovative aspect of the subject matter of this disclosure can be implemented in a timing synchronization controller for a communication device, where the timing synchronization controller includes a processing system and a memory. The memory stores instructions that, when executed by the processing system, cause the timing synchronization controller to detect a first frame of one or more frames output by a PMA sublayer of the communication device to a PCS of the communication device; generate a timestamp responsive to detecting the first frame, where the timestamp indicates a time at which the PMA sublayer outputs the first frame to the PCS; and adjust the timestamp based at least in part on a packet recovered by the PCS from the one or more frames, where the packet includes a preamble followed by an SFD.

BRIEF DESCRIPTION OF THE DRAWINGS

The present implementations are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "computer system," "electronic system," and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, the IEEE 1588 standard defines a clock synchronization protocol (also referred to as the "Precision Time Protocol" (PTP)) that allows one or more devices in a network (also referred to as "slave devices") to synchronize their clocks with another device in the network (also referred to as the "master device") through an exchange of PTP packets. As used herein, the term "PTP packet" refers to any Ethernet packet conforming to the IEEE 1588 standard. Each PTP packet is timestamped at the time of transmission (by the transmitting device) and at the time of reception (by the receiving device). A transmit (TX) timestamp indicates a time at which a PTP packet is transmitted on a physical communication medium (such as a twisted-pair cable) by a digital-to-analog converter (DAC), and a receive (RX) timestamp indicates a time at which a PTP packet is received on the medium by an analog-to-digital converter (ADC). The accuracy of clock synchronization depends on how precisely the timestamps are captured during the transmission and reception of PTP packets TX timestamps can be captured in the physical layer (PHY), prior to encoding and scrambling the PTP packets, and adjusted to account for processing delays associated with the encoding and scrambling operations. RX timestamps can be captured in the PHY, after decoding and descrambling the PTP packets, and adjusted to account for processing delays associated with the decoding and descrambling operations. In existing PTP systems, the TX and RX timestamps are adjusted by a predetermined offset based on an estimated propagation delay between a media-independent interface (MII) and a media-dependent interface (MDI). However, each PTP packet crosses multiple clock domains as it propagates between the MII and the MDI, and each clock-domain crossing adds uncertainty (or error) to the estimated delay. Aspects of the present disclosure recognize that uncertainties associated with clock-domain crossings can be avoided by timestamping PTP packets closer to the physical communication medium (such as in the same clock domain as the MDI).

Various aspects relate generally to timestamping Ethernet packets, and more particularly, to capturing timestamps in the same clock domain as the MDI of a communication device. In some aspects, a PHY transceiver may generate an RX timestamp for a PTP packet based on a time at which a physical medium attachment (PMA) sublayer outputs, to a physical coding sublayer (PCS), one or more PHY frames carrying the PTP packet. More specifically, the RX timestamp is captured in the PMA clock domain and is passed along the RX pipeline as a sideband signal associated with the PTP packet. After the PCS recovers the PTP packet from the one or more PHY frames, the PHY transceiver can adjust the RX timestamp to account for any offset or delay between the beginning of the PTP packet and the beginning of the one or more PHY frames. In some implementations, the RX timestamp may indicate a time at which the PTP packet is received on the communication medium by an ADC. In such implementations, the PHY transceiver may determine the time of reception based on various clock skews or processing delays associated with the PMA sublayer, the ADC, or a first-in first-out buffer (FIFO) associated with the ADC.

In some other aspects, a PHY transceiver may generate a TX timestamp for a PTP packet based on a time at which a PCS outputs a reference frame to a PMA sublayer. More specifically, the TX timestamp may be generated prior to encoding and scrambling the PTP packet (via the PCS) and the reference frame may be any PHY frame output by the PCS at the time the TX timestamp is generated. As such, the TX timestamp may be offset relative to the time at which the reference frame is output by the PCS. For example, the offset may include an offset or delay between the beginning of the PTP packet and the beginning of one or more PHY frames in which the PTP packet is encoded. The offset also may be associated with a number of PHY frames, output by the PCS, between the reference frame and the PTP packet. In some implementations, the TX timestamp may indicate a time at which the PTP packet is transmitted on the communication medium by a DAC. In such implementations, the PHY transceiver may determine the time of transmission based on various clock skews or processing delays associated with the PMA sublayer, the DAC, or a FIFO associated with the DAC.

Particular implementations of the subject matter described in this disclosure can be implemented to realize one or more of the following potential advantages. As described above, existing PTP systems generate TX and RX timestamps closer to the MII based on a predetermined offset representing an estimated delay between the MII and the MDI. However, the PTP packet crosses multiple clock domains, between the MII and the MDI, which introduce uncertainty in the estimated delays. By generating timestamps based on a timing of PHY frames exchanged between the PCS and the PMA sublayer, aspects of the present disclosure may significantly improve the precision of the timing information conveyed by PTP packets. Because the PMA sublayer operates in the same clock domain as the MDI, the timing of the PHY frames more accurately reflects the times at which PTP packets are transmitted and received on the communication medium. In other words, the timestamping techniques of the present implementations may eliminate any uncertainties associated with clock domain crossings. As a result, the PTP procedure can be used for more accurate clock synchronization at significantly higher data rates.

Figure 1:
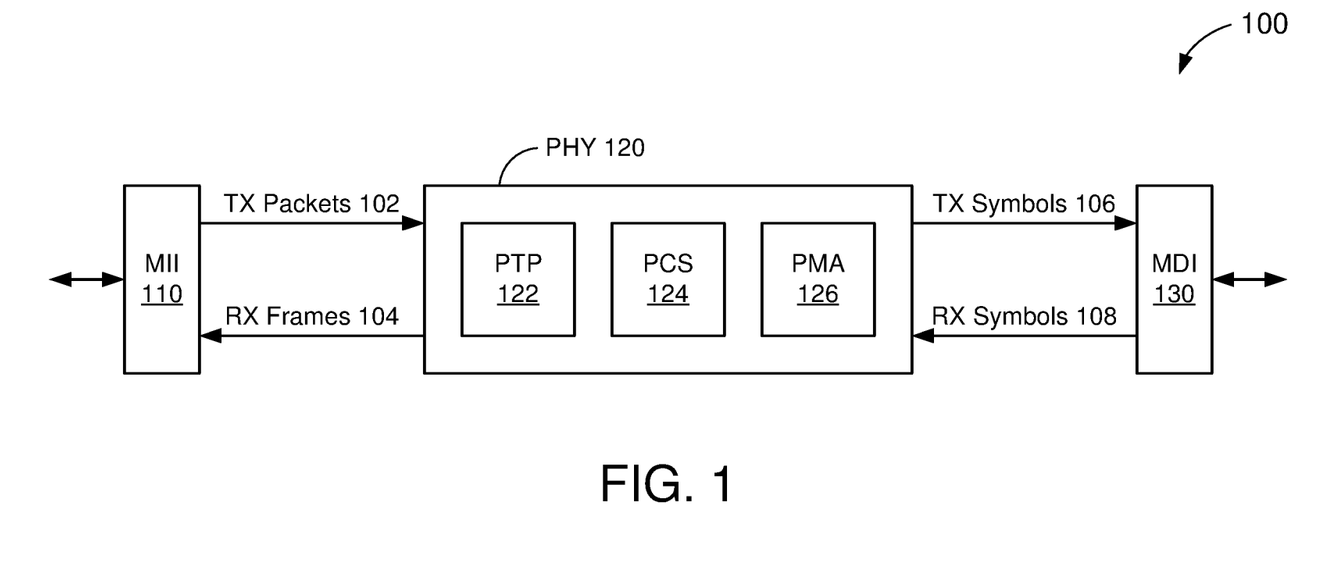
FIG. 1 shows a block diagram of an example transceiver for a communication device.

FIG. 1 shows a block diagram of an example transceiver 100 for a communication device. The transceiver 100 includes a media-independent interface (MII) 110, a physical layer (PHY) 120, and a media-dependent interface (MDI) 130. In some aspects, the transceiver 100 may support Ethernet communications conforming to the IEEE 802.3 family of standards. Example suitable Ethernet standards may include 10 gigabit Ethernet over twisted pair cable (10GBASE-T), 5 gigabit Ethernet over twisted pair cable (5GBASE-T), and 2.5 gigabit Ethernet over twisted pair cable (2.5GBASE-T), among other examples.

The MII 110 provides an interface between the PHY 120 and a medium access control (MAC) layer of the communication device. In some aspects, the MII 110 may be any suitable MII that conforms to existing versions of the IEEE 802.3 standard. Example suitable MIIs may include, among other examples, 10-gigabit MII (XGMII) and universal serial XGMII (USXGMII). The MDI 130 provides an interface between the PHY 120 and a physical communication medium (such as twisted pair cable). In some aspects, the MDI 130 may be any suitable MDI that conforms to existing versions of the IEEE 802.3 standard. In the example of FIG. 1, the transceiver 100 is configured to transmit and receive Ethernet frames on the physical communication medium. Accordingly, the transceiver 100 may include a TX pipeline to process data for transmission and an RX pipeline to process received data.

In the TX pipeline, the MII 110 may provide Ethernet packets 102 to the PHY 120 for transmission on a physical communication medium (also referred to as "TX packets"). Each TX packet 102 includes an Ethernet frame that is encoded (or generated) in the MAC layer of the communication device. The PHY 120 encodes the TX packets 102 as TX symbols 106 that can be driven or modulated onto the physical communication medium. Example suitable TX symbols 106 may include, among other examples, pulse amplitude modulation (PAM) symbols. The MDI 130 transmits the TX symbols 106 over the physical communication medium. For example, the MDI 130 may convert the TX symbols 106 to analog signals that can be driven or modulated on the physical communication medium.

In the RX pipeline, the MDI 130 receives the RX symbols 108 over the physical communication medium. For example, the MDI 130 may sample analog signals on the physical communication medium to recover the RX symbols 108. Example suitable RX symbols 108 may include, among other examples, PAM symbols. The PHY 120 decodes the RX symbols 108 to recover Ethernet frames 104 that are suitable for processing by the MAC layer of the communication device (also referred to as "RX frames"). Each RX frame 104 can be decoded (or interpreted) in the MAC layer. The MII 110 may provide the RX frames 104 to the MAC layer of the communication device for further processing.

In some implementations, the PHY 120 may include a Precision Time Protocol (PTP) processor 122, a physical coding sublayer (PCS) 124, and a physical medium attachment (PMA) sublayer 126. The PTP processor 122 is configured to process PTP packets in accordance with the IEEE 1588 standard. As used herein, the term "PTP packet" refers to any Ethernet packet having a payload carrying PTP information (or a "PTP message"). Such PTP information can be encapsulated in TX packets 102 or RX frames 104. In the TX pipeline, the PCS 124 encodes each TX packet 102 as one or more PHY frames and the PMA sublayer 126 maps each PHY frame to one or more TX symbols 106. In the RX pipeline, the PMA sublayer 126 demaps RX symbols 108 as one or more PHY frames and the PCS 124 decodes the PHY frames to recover one or more Ethernet packets each carrying a respective RX frame 104.

In some aspects, the PTP processor 122 may timestamp PTP packets to be transmitted, or received, on the physical communication medium. In some implementations, the PTP processor 122 may capture or acquire a TX timestamp in response to receiving a TX packet 102 from the MII 110. The TX timestamp may indicate a time at which the TX packet 102 is transmitted on the communication medium (according to a local clock of the communication device). The PTP processor 122 may insert the TX timestamp into the payload of a TX packet 102 to be transmitted, over the communication medium, to a receiving device. As such, the TX timestamp may be generated before the TX packet 102 is encoded, by the PCS 124, into one or more PHY frames.

In some other implementations, the PTP processor 122 may capture or acquire an RX timestamp in response to receiving an Ethernet packet (including an RX frame 104) from the PCS 124. The RX timestamp may indicate a time at which the RX frame 104 is received on the communication medium (according to the local clock of the communication device). However, the PTP processor 122 must detect the start of the RX frame 104 to determine when to capture or acquire the RX timestamp. As such, the RX timestamp may be generated after the Ethernet packet is recovered, by the PCS 124, from one or more PHY frames.

Because the PTP processor 122 generates TX timestamps before respective TX packets 102 are encoded and generates RX timestamps after respective RX frames 104 are recovered, the TX and RX timestamps should account for processing (or propagation) delays associated with the TX and RX pipelines (such as in the PCS 124, the PMA sublayer 126, or the MDI 130). For example, the PTP processor 122 may apply a timing offset to the time at which it detects a TX packet 102 so that the TX timestamp can account for delays associated with the TX pipeline. Similarly, the PTP processor 122 may apply a timing offset to the time at which it detects an RX frame 104 so that the RX timestamp can account for delays associated with the RX pipeline.

In existing PTP systems, the timing offsets are predetermined values based on estimated processing delays associated with the TX and RX pipelines. However, each TX packet 102 and RX frame 104 crosses multiple clock domains as it propagates between the MII 110 and the MDI 130, with each clock-domain crossing adding uncertainty (or error) to the estimated delay. Aspects of the present disclosure recognize that uncertainties associated with clock-domain crossings can be avoided by timestamping PTP packets closer to the physical communication medium (such as in the same clock domain as the MDI 130). In some aspects, the PTP processor 122 may generate TX and RX timestamps based, at least in part, on a timing of PHY frames exchanged between the PCS 124 and the PMA sublayer 126.

Figure 2:
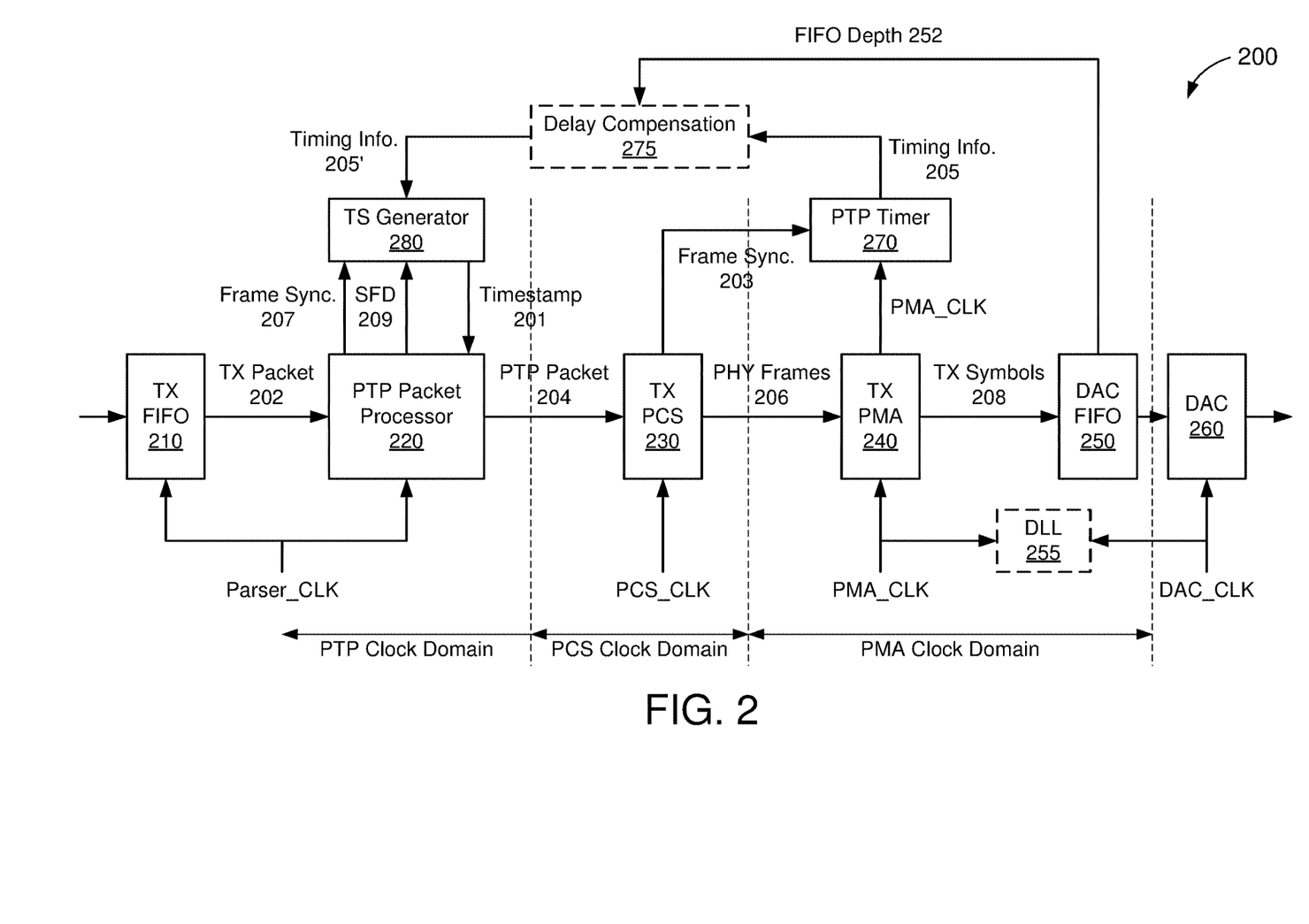
FIG. 2 shows a block diagram of an example transmit (TX) processing chain, according to some implementations.

FIG. 2 shows a block diagram of an example TX processing chain 200, according to some implementations. In some implementations, the TX processing chain 200 may be one example of the transceiver 100 of FIG. 1. More specifically, the TX processing chain 200 may represent the TX pipeline of the transceiver 100. Accordingly, the TX processing chain 200 may be configured to receive TX packets 202 from a MAC layer of a communication device (not shown for simplicity) and encode the TX packets 202 as TX symbols 208 that can be transmitted on a physical communication medium (such as a twisted pair cable). With reference for example to FIG. 1, each of the TX packets 202 may be one example of any of the TX packets 102 and each of the TX symbols 208 may be one example of any of the TX symbols 106.

The TX processing chain 200 includes a TX first-in first-out buffer (FIFO) 210, a PTP packet processor 220, a TX physical coding sublayer (PCS) 230, a TX physical medium attachment (PMA) sublayer 240, a digital-to-analog converter (DAC) FIFO 250, a DAC 260, a PTP timer 270, and a timestamp (TS) generator 280. The PTP packet processor 220 operates in response to a parser clock (Parser_CLK) signal and is said to reside in the "PTP clock domain." The TX PCS 230 operates in response to a PCS clock (PCS_CLK) signal and is therefore said to reside in the "PCS clock domain." The TX PMA sublayer 240 operates in response to a PMA clock (PMA_CLK) signal and is therefore said to reside in the "PMA clock domain." The DAC 260 operates in response to a DAC clock (DAC_CLK) signal, which is an integer multiple of the PMA_CLK signal and is therefore also said to reside in the PMA clock domain.

The TX FIFO 210 stores or buffers TX packets 202 received from the MAC layer. Each TX packet 202 includes a preamble and a start frame delimiter (SFD) followed by an Ethernet frame. The preamble is a 56-bit pattern that can be used by a receiving device to synchronize its receiver clocks with the transmission of the TX packet 202. The SFD is an 8-bit pattern that signals the beginning of the Ethernet frame (and the end of the preamble). The Ethernet frame includes a MAC header, a payload, and a frame check sequence (FCS). The MAC header indicates the source and destination of the Ethernet frame (based on the MAC addresses of the transmitting and receiving devices) and the length or type of information carried in the payload. The payload carries user data or other information to be exchanged between the transmitting device and the receiving device. The FCS is used by the receiving device to check for errors in the Ethernet frame.

The PTP packet processor 220 is configured to insert PTP information into the payload of a TX packet 202 to produce a respective PTP packet 204. The PTP information may include any information necessary to support a PTP clock synchronization procedure. In some implementations, the PTP information may include a timestamp 201 indicating a time at which the PTP packet 204 is to be transmitted on the physical communication medium. The TX PCS 230 encodes the PTP packet 204 as one or more PHY frames 206 based on a forward error correction (FEC) coding scheme. Example suitable FEC coding schemes may include Reed-Solomon codes and low-density parity-check (LDPC) codes, among other examples. In some implementations, the TX PCS 230 may further scramble the bits of each FEC codeword and serialize the scrambled bits for output as the PHY frames 206.

The TX PMA sublayer 240 maps each of the PHY frames 206 to one or more TX symbols 208 according to a modulation scheme. An example suitable modulation scheme may include, among other examples, pulse amplitude modulation (PAM). The DAC FIFO 250 stores or buffers the TX symbols 208 until they can be transmitted onto the physical communication medium by the DAC 260. More specifically, the DAC 260 converts the TX symbols 208 to an analog signal that can be modulated or otherwise transmitted on the physical communication medium. In some aspects, the timestamp 201 may indicate the time at which the PTP packet 204 is transmitted by the DAC 260 as a series of TX symbols 208. However, as shown in FIG. 2, the PTP packet 204 crosses multiple clock domains (including the PCS clock domain and the PMA clock domain) between the time at which the timestamp 201 is generated and the time at which the TX symbols 208 are transmitted.

In some aspects, the TS generator 280 may generate the timestamp 201 based on timing information 205 captured or acquired in the PMA clock domain. More specifically, the timing information 205 may indicate the time, according to the PMA_CLK signal, at which the TX PCS 230 outputs a PHY frame 206 (also referred to as a "reference frame") to the TX PMA sublayer 240. For example, the TX PCS 230 may output a respective frame synchronization signal 203 (to the PTP timer 270) to signal the start of each PHY frame 206. Similarly, the PTP packet processor 220 also may output a respective frame synchronization signal 207 (to the TS generator 280) to signal the start of a PHY frame in which the PTP packet 204 is to be encoded (also referred to as a "PTP frame"). Aspects of the present disclosure recognize that the reference frame precedes the PTP frame by a fixed number (N) of PHY frames 206. In other words, when the frame synchronization signals 203 and 207 are aligned, the timing information 205 indicates a timing of a PHY frame 206 that is N frames ahead of the PTP packet 204.

In some implementations, the TS generator 280 may calculate or otherwise determine the time at which the PTP packet 204 will arrive at the TX PMA sublayer 240 (as one or more PHY frames 206) based, at least in part, on the timing information 205 captured by the PTP timer 270 and the number N of PHY frames 206 preceding the PTP frame, up to (and including) the reference frame. For example, each PHY frame 206 may have a known duration ($\Delta_{frame}$) based on various encoding parameters implemented by the TX PCS 230 (such as coding scheme or codeword length). Thus, the delay ($\Delta_{TX}$) between the reference frame and the PTP frame can be calculated as:

$$\Delta_{TX} = N * \Delta_{frame} \qquad (1)$$

Aspects of the present disclosure recognize that the beginning of the PTP packet 204 (or Ethernet frame) may not be aligned with the beginning of the PTP frame 206 (or the first PTP frame in a series of PTP frames) in which it is encoded. More specifically, the beginning of the PTP packet 204 may trail the beginning of the PTP frame 206 by a number (M) of bits. In some implementations, the TS generator 280 may determine the offset M between the beginning of the PTP packet 204 and the beginning of the PTP frame 206 based on the SFD of the TX packet 202. For example, the PTP packet processor 220 may extract SFD information 209 indicating the start of the PTP packet 204. The TS generator 280 may further convert the offset M to a delay ($\Delta_{TX\_SFD}$) based on a data rate ($R_{TX}$) associated with the Parser_CLK signal:

$$\Delta_{TX\_SFD} = M * R_{TX} \qquad (2)$$

In some implementations, the TS generator 280 may determine the timestamp 201 (TX timestamp) associated with the PTP packet 204 based on the time ($T_{ref}$) at which the TX PCS 230 outputs the reference frame to the TX PMA sublayer 240 (as indicated by the timing information 205):

$$\text{TX\_Timestamp} = T_{ref} + \Delta_{TX} + \Delta_{TX\_SFD} \qquad (3)$$

The TX timestamp in Equation 3 is associated with the PMA clock domain, which is the same clock domain in which the DAC 260 resides, and thus avoids any of the uncertainties associated with clock domain crossings. However, aspects of the present disclosure further recognize that the PTP packet 204 may experience additional delays between the time at which the TX PCS 230 outputs the PTP frame(s) to the time at which the DAC 260 transmits analog signals onto the physical communication medium. For example, such delays may be caused by processing delays in the TX PMA sublayer 240, processing delays in the DAC FIFO 250, or clock skew between the PMA_CLK signal and the DAC_CLK signal.

In some aspects, the TX processing chain 200 may further include a delay compensation component 275 that can adjust the timing information 205 to compensate for additional delays in the TX pipeline. In some implementations, the delay compensation component 275 may compensate for a data pipeline delay associated with the TX PMA sublayer 240 (such as a delay inserted by a digital signal processor (DSP) for echo cancellation, or a delay associated with a FIFO used for data alignment between clock domains). Aspects of the present disclosure recognize that the data pipeline delay is a fixed value that can be extracted from simulations.

In some other implementations, the delay compensation component 275 may compensate for a buffer delay associated with the DAC FIFO 250. In such implementations, the delay compensation component 275 may retrieve FIFO depth information 252 indicating a number (Q) of TX symbols stored or queued for transmission in the DAC FIFO 250. The delay compensation component 275 may further calculate the buffer delay based on the number Q of queued TX symbols and a period of the PMA_CLK signal.

Still further, in some implementations, the delay compensation component 275 may compensate for clock skew between the PMA_CLK signal and the DAC_CLK signal. In such implementations, the TX processing chain 200 may further include a delay-locked loop (DLL) 255 configured to measure the delay or clock skew between the PMA_CLK signal and the DAC_CLK signal. The delay compensation component 275 may receive clock skew information from the DLL 255 indicating the measured delay between the PMA_CLK signal and the DAC_CLK signal.

In some aspects, the delay compensation component 275 may produce adjusted timing information 205' that compensates for the data pipeline delay ($\Delta_{TX\_pipeline}$), the buffer delay ($\Delta_{TX\_buffer}$), the clock skew ($\Delta_{TX\_CLK}$), or any combination thereof. For example, the adjusted timing information 205' ($T_{TX\_adj}$) can be calculated as:

$$T_{TX\_adj} = T_{ref} + \Delta_{TX\_pipeline} + \Delta_{TX\_buffer} + \Delta_{TX\_CLK} \quad (4)$$

By substituting $T_{TX\_adj}$ for $T_{ref}$ in Equation 3, the PTP packet processor 220 may generate a TX timestamp 201 that more precisely indicates the time at which the PTP packet 204 will be transmitted on the physical communication medium.

Figure 3:
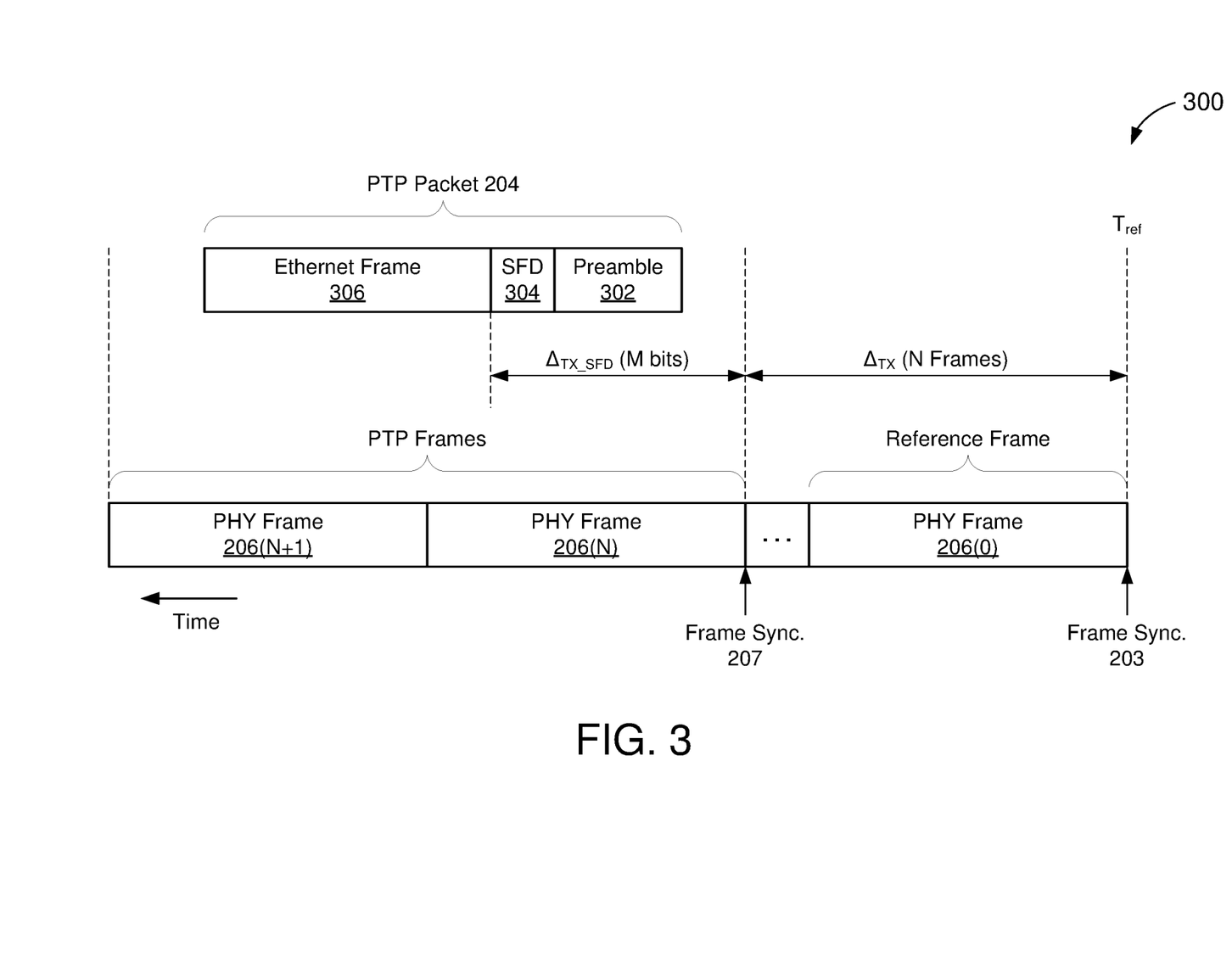
FIG. 3 shows a timing diagram depicting an example relationship between an Ethernet packet and a series of physical layer (PHY) frames processed by the TX processing chain 200 of FIG. 2.

FIG. 3 shows a timing diagram 300 depicting an example relationship between a PTP packet 204 and a series of PHY frames 206(0)-206(N+1) processed by the TX processing chain 200 of FIG. 2. As shown in FIG. 3, the PTP packet 204 includes a preamble 302, an SFD 304, and an Ethernet frame 306. In the example of FIG. 3, the PTP packet 204 is encoded across two PHY frames 206(N) and 206(N+1) (also referred to as PTP frames). However, in actual implementations, the PTP packet 204 may be encoded in fewer or more PHY frames 206 than those depicted in FIG. 3.

The frame synchronization signal 207 indicates the start of the PTP frame 206(N) which contains the beginning portion of the PTP packet 204 (including the SFD 304). The frame synchronization signal 203 indicates the start of a preceding PHY frame 206(0) (also referred to as a reference frame) that is output by the TX PCS 230 at substantially the same time that the PTP packet processor 220 receives the PTP packet 204. Further, the timing information 205 indicates the time ($T_{ref}$), in the PMA clock domain, at which the reference frame 206(0) is output by the TX PCS 230.

As shown in FIG. 3, the reference frame 206(0) precedes the PTP frame 206(N) by N PHY frames 206. Because each PHY frame 206 has the same length (and duration), the delay $\Delta_{TX}$ between the reference frame 206(0) and the PTP frame 206(N) can be determined according to Equation 1. As further shown in FIG. 3, the beginning of the Ethernet frame 306 trails the beginning of the PTP frame 206(N) by M bits. Because the PTP packet 204 is encoded into PHY frames 206 at a data rate associated with the Parser_CLK signal, the delay $\Delta_{TX\_SFD}$ between the start of the Ethernet frame 306 and the start of the PTP frame 206(N) can be calculated using Equation 2.

By combining $T_{ref}$ with $\Delta_{TX}$ and $\Delta_{TX\_SFD}$, according to Equation 3, the TS generator 280 can precisely calculate the time at which the PTP packet 204 will be output by the TX PCS 230 to the TX PMA layer 240. By further adjusting $T_{ref}$ to compensate for additional delays between the TX PCS 230 and the DAC 260 (such as data pipeline delays associated with the TX PMA sublayer 240, buffer delays associated with the DAC FIFO 250, or clock skew between the PMA_CLK signal and the DAC_CLK signal), the TS generator 280 can more precisely calculate the time at which the PTP packet 204 will be output by the DAC 260 onto the physical communication medium.

Figure 4:
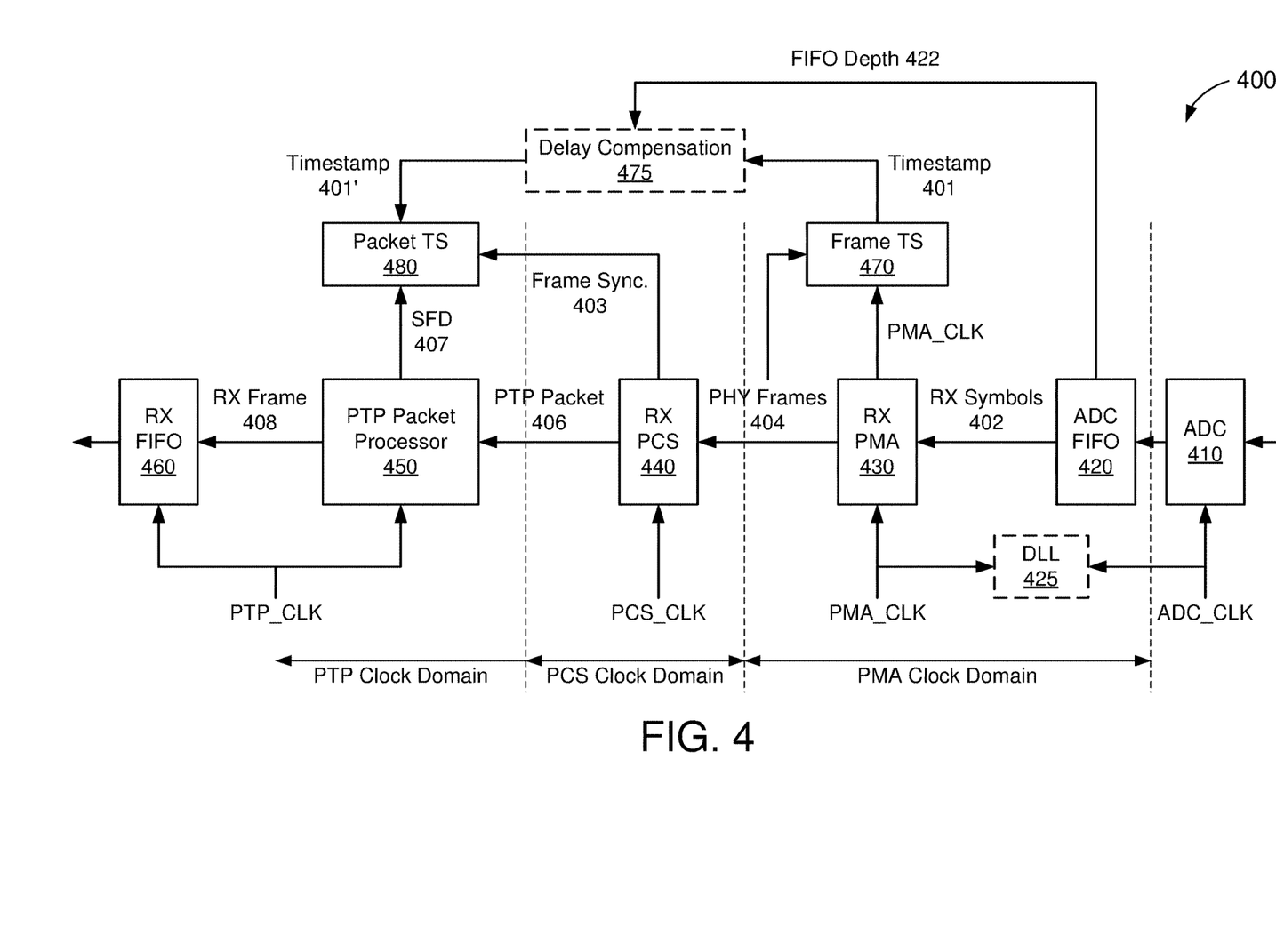
FIG. 4 shows a block diagram of an example receive (RX) processing chain, according to some implementations.

FIG. 4 shows a block diagram of an example RX processing chain 400, according to some implementations. In some implementations, the RX processing chain 400 may be one example of the transceiver 100 of FIG. 1. More specifically, the RX processing chain 400 may represent the RX pipeline of the transceiver 100. Accordingly, the RX processing chain 400 may be configured to receive RX symbols 402 from a physical communication medium (such as a twisted pair cable) and decode the RX symbols 402 as RX frames 408 that can be processed by a MAC layer of a communication device (not shown for simplicity). With reference for example to FIG. 1, each of the RX symbols 402 may be one example of any of the RX symbols 108 and each of the RX frames 408 may be one example of any of the RX frames 104.

The RX processing chain 400 includes an analog-to-digital converter (ADC) 410, an ADC FIFO 420, an RX PMA sublayer 430, an RX PCS 440, a PTP packet processor 450, an RX FIFO 460, a frame timestamping (TS) component 470, and a packet timestamping (TS) component 480. The PTP packet processor 450 operates in response to a PTP clock (PTP_CLK) signal and is therefore said to reside in the "PTP clock domain." With reference for example to FIG. 2, the Parser_CLK and PTP_CLK signals may operate in the same clock domain. The RX PCS 440 operates in response to a PCS clock (PCS_CLK) signal and is therefore said to reside in the "PCS clock domain." The RX PMA sublayer 430 operates in response to a PMA clock (PMA_CLK) signal and is therefore said to reside in the "PMA clock domain." The ADC 410 operates in response to an ADC clock (ADC_CLK) signal, which is an integer multiple of the PMA_CLK signal and is therefore also said to reside in the PMA clock domain.

The ADC 410 receives the RX symbols 402 from the physical communication medium. More specifically, the ADC 410 converts analog signals on the physical communication medium to digital samples that can be processed or interpreted by the RX PMA sublayer 430. The ADC FIFO 420 stores or buffers the RX symbols 402 until they can be processed by the RX PMA sublayer 430. The RX PMA sublayer 430 demaps or otherwise recovers one or more PHY frames 404 from the RX symbols 402 according to a modulation scheme. An example suitable modulation scheme may include, among other examples, PAM. In some aspects, the RX PMA sublayer 430 may reverse the mapping performed by the TX PMA sublayer 240 of FIG. 2. In some implementations, the RX PMA sublayer 430 also may perform clock recovery based on the RX symbols 402.

The RX PCS 440 decodes the PHY frames 404 to recover one or more PTP packets 406 based on a FEC coding scheme. Example suitable FEC coding schemes may include Reed-Solomon codes and LDPC codes, among other examples. In some aspects, the RX PCS 440 may reverse the encoding performed by the TX PCS 230 of FIG. 2. In some implementations, the RX PCS 440 may further descramble the bits of each FEC codeword and deserialize the scrambled bits prior to performing the decoding operation. The PTP packet processor 450 is configured to recover PTP information from the payload of each PTP packet 406. The PTP information may include any information necessary to support a PTP clock synchronization procedure (such as a timestamp indicating the time at which the PTP packet 406 was transmitted onto the physical communication medium).

As described with reference to FIGS. 2 and 3, each PTP packet 406 is an Ethernet packet having a preamble and an SFD followed by an Ethernet frame. In some aspects, the PTP packet processor 450 may remove the preamble and the SFD from each PTP packet 406 to recover a respective RX frame 408. The RX FIFO 460 stores or buffers the RX frames 408 until they can be processed by the MAC layer of the communication device. In some aspects, the packet TS component 480 may detect the start of the PTP packet 406 (or RX frame 408) based on the SFD and may generate an RX timestamp indicating a time at which the PTP packet 406 is received on the physical communication medium. For example, the PTP packet processor 450 may extract SFD information 407 indicating the start of the PTP packet 406.

In some implementations, the RX timestamp may indicate the time at which the PTP packet 406 is received by the ADC 410 as a series of RX symbols 402. However, as shown in FIG. 2, the PTP packet 406 crosses multiple clock domains (including the PCS clock domain and the PMA clock domain) between the time at which the RX symbols 402 are received and the time at which the RX timestamp is generated. In some aspects, the packet TS component 480 may generate the RX timestamp based on a timestamp 401 captured or acquired in the PMA clock domain. More specifically, the timestamp 401 may indicate the time, according to the PMA_CLK signal, at which the RX PMA sublayer 430 outputs, to the RX PCS 440, a PHY frame 404 in which the PTP packet 406 is encoded (also referred to as a "PTP frame"). In some implementations, the frame TS component 470 may be configured to detect PTP frames output by the RX PMA sublayer 430 and generate the timestamp 401 in response thereto.

Aspects of the present disclosure recognize that the beginning of the PTP packet 406 (or RX frame 408) may not be aligned with the beginning of the PTP frame 404 (or the first PTP frame in a series of PTP frames) in which it is encoded. More specifically, the beginning of the PTP packet 406 may trail the beginning of the PTP frame 404 by a number (K) of bits. In some implementations, the packet TS component 480 may determine the offset K between the beginning of the PTP packet 406 and the beginning of the PTP frame 404 based on the SFD information 407 received from the PTP packet processor 450 and a frame synchronization signal 403 received from the RX PCS 440. For example, the RX PCS 440 may output the frame synchronization signal 403 (to the packet TS component 480) to signal the start of a PTP frame. The packet TS component 480 may further convert the offset K to a delay ($\Delta_{RX\_SFD}$) based on a data rate (RRx) associated with the PTP_CLK signal:

$$\Delta_{RX\_SFD} = K * R_{RX} \quad (5)$$

In some implementations, the packet TS component 480 may determine the RX timestamp associated with the PTP packet 406 based on the time ($T_{RX}$) at which the RX PMA sublayer 430 outputs the PTP frame 404 to the RX PCS 440 (as indicated by the timestamp 401):

$$RX\_Timestamp = T_{RX} + \Delta_{RX\_SFD} \quad (6)$$

The RX timestamp in Equation 5 is associated with the PMA clock domain, which is the same clock domain in which the DAC 260 resides, and thus avoids any of the uncertainties associated with clock domain crossings. However, aspects of the present disclosure further recognize that the PTP packet 406 may experience additional delays between the time at which the ADC 410 receives analog signals on the physical communication medium to the time at which the RX PMA sublayer 430 outputs the PTP frame(s). For example, such delays may be caused by processing delays in the RX PMA sublayer 430, processing delays in the ADC FIFO 420, or clock skew between the PMA_CLK signal and the ADC_CLK signal.

In some aspects, the RX processing chain 400 may further include a delay compensation component 475 that can adjust the timestamp 401 to compensate for additional delays in the RX pipeline. In some implementations, the delay compensation component 475 may compensate for a data pipeline delay associated with the RX PMA sublayer 430 (such as a delay inserted by a DSP for echo cancellation, or a delay associated with a FIFO used for data alignment between clock domains). As described with reference to FIG. 2, the data pipeline delay is a fixed value that can be extracted from simulations.

In some other implementations, the delay compensation component 475 may compensate for a buffer delay associated with the ADC FIFO 420. In such implementations, the delay compensation component 475 may retrieve FIFO depth information 422 indicating a number (L) of RX symbols stored or queued for transmission in the ADC FIFO 420. The delay compensation component 475 may further calculate the buffer delay based on the number L of queued RX symbols and a period of the PMA_CLK signal.

Still further, in some implementations, the delay compensation component 475 may compensate for clock skew between the PMA CLK signal and the ADC_CLK signal. In such implementations, the RX processing chain 400 may further include a DLL 425 configured to measure the delay or clock skew between the PMA_CLK signal and the ADC_CLK signal. The delay compensation component 475 may receive clock skew information from the DLL 425 indicating the measured delay between the PMA_CLK signal and the ADC_CLK signal.

In some aspects, the delay compensation component 475 may produce an adjusted timestamp 401' that compensates for the data pipeline delay ($\Delta_{RX\_pipeline}$), the buffer delay ($\Delta_{RX\_buffer}$), the clock skew ($\Delta_{RX\_CLK}$), or any combination thereof. For example, the adjusted timestamp 401' ($T_{RX\_adj}$) can be calculated as:

$$T_{RX\_adj} = T_{RX} + \Delta_{RX\_pipeline} + \Delta_{RX\_buffer} + \Delta_{RX\_CLK} \quad (7)$$

By substituting $T_{RX\_adj}$ for $T_{RX}$ in Equation 6, the PTP packet processor 450 may generate an RX timestamp that more precisely indicates the time at which the PTP packet 406 was received on the physical communication medium.

Figure 5:
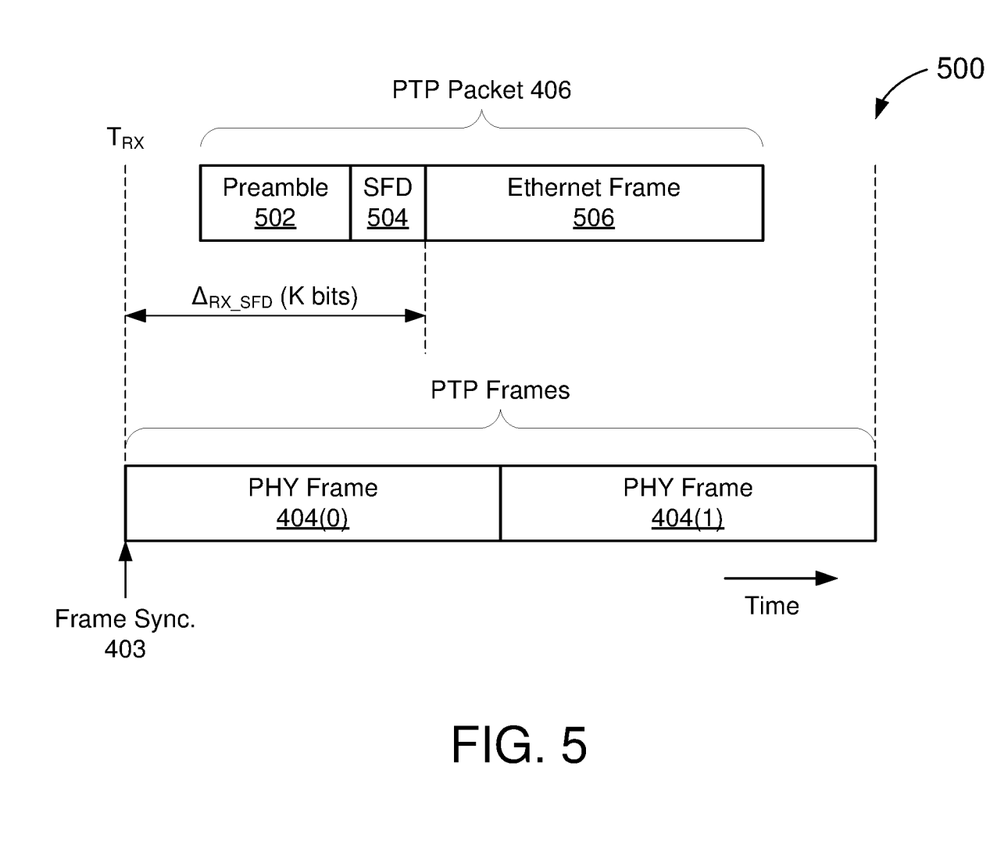
FIG. 5 shows another timing diagram depicting an example relationship between an Ethernet packet and a series of PHY frames processed by the RX processing chain 400 of FIG. 4.

FIG. 5 shows another timing diagram 500 depicting an example relationship between a PTP packet 406 and a series of PHY frames 404(0) and 404(1) processed by the RX processing chain 400 of FIG. 4. As shown in FIG. 5, the PTP packet 406 includes a preamble 502, an SFD 504, and an Ethernet frame 506. In the example of FIG. 3, the PTP packet 406 is encoded across two PHY frames 404(0) and 404(1) (also referred to as PTP frames). However, in actual implementations, the PTP packet 406 may be encoded in fewer or more PHY frames 404 than those depicted in FIG. 5.

The frame synchronization signal 403 indicates the start of the PTP frame 404(0) which contains the beginning portion of the PTP packet 406 (including the SFD 504). Further, the timestamp 401 indicates the time ($T_{RX}$), in the PMA clock domain, at which the PTP frame 404(0) is output by the RX PMA sublayer 430. As shown in FIG. 3, the beginning of the Ethernet frame 506 trails the beginning of the PTP frame 404(0) by K bits. Because the PTP packet 406 is encoded into PHY frames 404 at a data rate associated with the PTP_CLK signal, the delay $\Delta_{RX\_SFD}$ between the start of the Ethernet frame 506 and the start of the PTP frame 404(0) can be calculated using Equation 5.

Figure 6:
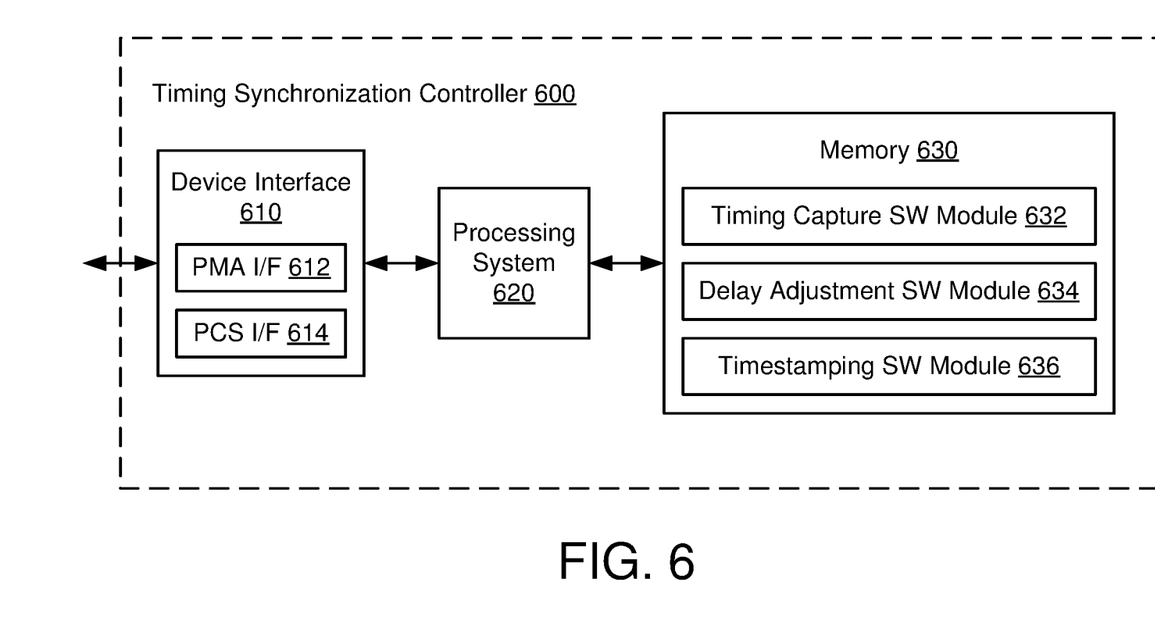
FIG. 6 shows a block diagram of an example timing synchronization controller, according to some implementations.

By combining $T_{RX}$ with $\Delta_{RX\_SFD}$, according to Equation 6, the packet TS component 480 can precisely calculate the time at which the PTP packet 406 was output by the RX PMA sublayer 430 to the RX PCS 440. By further adjusting $T_{RX}$ to compensate for additional delays between the RX PCS 440 and the ADC 410 (such as data pipeline delays associated with the RX PMA sublayer 430, buffer delays associated with the ADC FIFO 420, or clock skew between the PMA_CLK signal and the ADC_CLK signal), the packet TS component 480 can more precisely calculate the time at which the PTP packet 406 was received by the ADC 410 on the physical communication medium FIG. 6 shows a block diagram of an example timing synchronization controller 600, according to some implementations. In some implementations, the timing synchronization controller 600 may be configured to generate TX timestamps associated with PTP packets to be transmitted on a physical communication medium. The timing synchronization controller 600 includes a device interface 610, a processing system 620, and a memory 630.

The device interface 610 is configured to communicate with one or more components of a TX processing chain of a communication device (such as the TX processing chain 200 of FIG. 2). In some implementations, the device interface 610 may include a PMA interface (I/F) 612 and a PCS interface (I/F) 614. The PMA interface 612 may be configured to communicate with one or more components of the TX processing chain residing in the PMA clock domain. The PCS interface 614 may be configured to communicate with one or more components of the TX processing chain residing in the PCS clock domain.

The memory 630 may include a non-transitory computer-readable medium (including one or more nonvolatile memory elements, such as EPROM, EEPROM, Flash memory, or a hard drive, among other examples) that may store at least the following software (SW) modules:
- a timing capture SW module 632 to acquire timing information indicating a time at which a PCS of the communication device outputs a first frame to a PMA sublayer of the communication device;
- a delay adjustment SW module 634 to determine a delay between the first frame and a packet having a preamble followed by an SFD; and
- a timestamping SW module 636 to generate a timestamp based at least in part on the timing information and the delay between the first frame and the packet and insert the timestamp into the packet.

Each software module includes instructions that, when executed by the processing system 620, causes the timing synchronization controller 600 to perform the corresponding functions.

The processing system 620 may include any suitable one or more processors capable of executing scripts or instructions of one or more software programs stored in the timing synchronization controller 600 (such as in the memory 630). For example, the processing system 620 may execute the timing capture SW module 632 to acquire timing information indicating a time at which a PCS of the communication device outputs a first frame to a PMA sublayer of the communication device. The processing system 620 also may execute the delay adjustment SW module 634 to determine a delay between the first frame and a packet having a preamble followed by an SFD. Further, the processing system 620 may execute the timestamping SW module 636 to generate a timestamp based at least in part on the timing information and the delay between the first frame and the packet and insert the timestamp into the packet.

Figure 7:
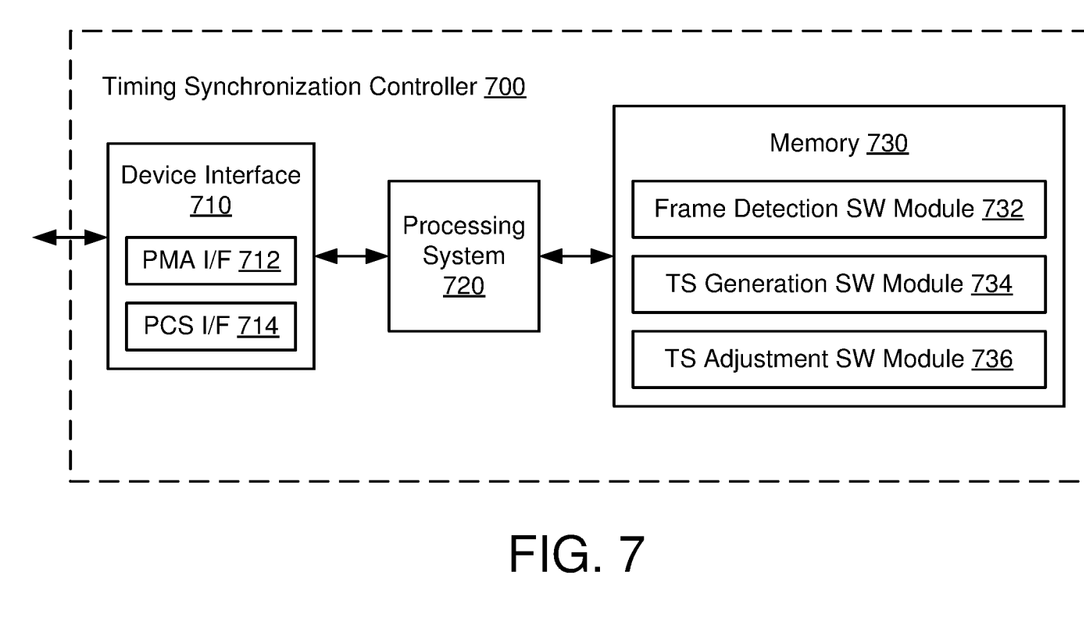
FIG. 7 shows another block diagram of an example timing synchronization controller, according to some implementations.

FIG. 7 shows another block diagram of an example timing synchronization controller 700, according to some implementations. In some implementations, the timing synchronization controller 700 may be configured to generate RX timestamps associated with PTP packets received on a physical communication medium. The timing synchronization controller 700 includes a device interface 710, a processing system 720, and a memory 730.

The device interface 710 is configured to communicate with one or more components of an RX processing chain of a communication device (such as the RX processing chain 400 of FIG. 4). In some implementations, the device interface 710 may include a PMA interface (I/F) 712 and a PCS interface (I/F) 714. The PMA interface 712 may be configured to communicate with one or more components of the RX processing chain residing in the PMA clock domain. The PCS interface 714 may be configured to communicate with one or more components of the RX processing chain residing in the PCS clock domain.

The memory 730 may include a non-transitory computer-readable medium (including one or more nonvolatile memory elements, such as EPROM, EEPROM, Flash memory, or a hard drive, among other examples) that may store at least the following software (SW) modules:
- a frame detection SW module 732 to detect a first frame of one or more frames output by a PMA sublayer of the communication device to a PCS of the communication device;
- a timestamp (TS) generation SW module 734 to generate a timestamp responsive to detecting the first frame, where the timestamp indicates a time at which the PMA sublayer outputs the first frame to the PCS; and
- a TS adjustment SW module 736 to adjust the timestamp based at least in part on a packet recovered by the PCS from the one or more frames, where the packet includes a preamble followed by am SFD.

Each software module includes instructions that, when executed by the processing system 720, causes the timing synchronization controller 700 to perform the corresponding functions.

The processing system 720 may include any suitable one or more processors capable of executing scripts or instructions of one or more software programs stored in the timing synchronization controller 700 (such as in the memory 730). For example, the processing system 720 may execute the frame detection SW module 732 to detect a first frame of one or more frames output by a PMA sublayer of the communication device to a PCS of the communication device. The processing system 720 also may execute the TS generation SW module 734 to generate a timestamp responsive to detecting the first frame, where the timestamp indicates a time at which the PMA sublayer outputs the first frame to the PCS. Further, the processing system 720 may execute the TS adjustment SW module 736 to adjust the timestamp based at least in part on a packet recovered by the PCS from the one or more frames, where the packet includes a preamble followed by am SFD.

Figure 8:
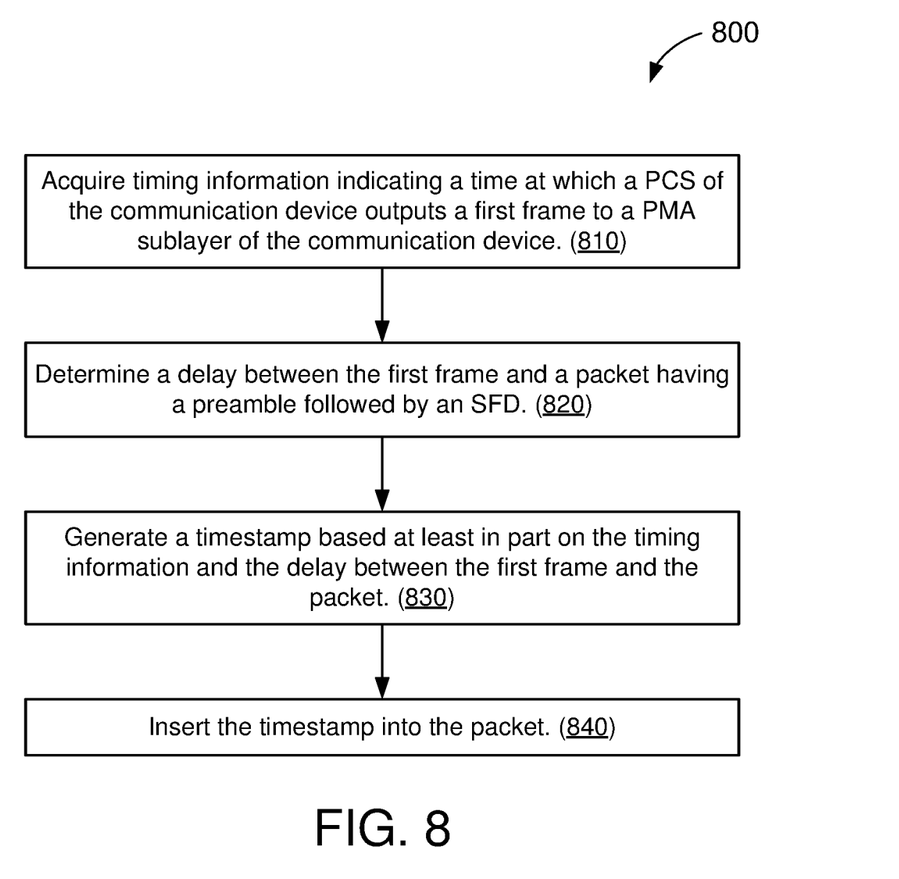
FIG. 8 shows an illustrative flowchart depicting an example operation for timestamping packets, according to some implementations.

FIG. 8 shows an illustrative flowchart depicting an example operation 800 for timestamping packets, according to some implementations. In some implementations, the example operation 800 may be performed by a timing synchronization controller of a communication device such as the timing synchronization controller 600 of FIG. 6.

The timing synchronization controller acquires timing information indicating a time at which a PCS of the communication device outputs a first frame to a PMA sublayer of the communication device (810). In some aspects, the acquiring of the timing information may include recording the time at which the PCS outputs the first frame based on a clock signal associated with the PMA sublayer. The timing synchronization controller determines a delay between the first frame and a packet having a preamble followed by an SFD (820). The timing synchronization controller generates a timestamp based at least in part on the timing information and the delay between the first frame and the packet (830). The timing synchronization controller further inserts the timestamp into the packet (840).

In some aspects, the packet may be encoded via the PCS so that the SFD is carried in a second frame, output by the PCS, following the first frame. In some implementations, the delay between the first frame and the packet may be determined based on a number of frames output by the PCS between the first frame and the second frame. In some implementations, the determining of the delay between the first frame and the packet may include determining an offset between the SFD of the packet and the beginning of the second frame.

In some aspects, the second frame may be mapped to one or more symbols via the PMA sublayer. In some implementations, the timing synchronization controller may further adjust the timing information based on a delay associated with the mapping of the second frame to the one or more symbols.

In some aspects, the one or more symbols may be buffered in a FIFO associated with a DAC that transmits data over a communication medium. In some implementations, the timing synchronization controller may further determine a number of symbols buffered in the FIFO at the time the first frame is output by the PCS and adjust the timing information based on the number of symbols buffered in the FIFO. In some other implementations, the timing synchronization controller may further determine a clock skew between a clock signal associated with the PMA sublayer and a clock signal associated with the DAC and adjust the timing information based on the determined clock skew.

Figure 9:
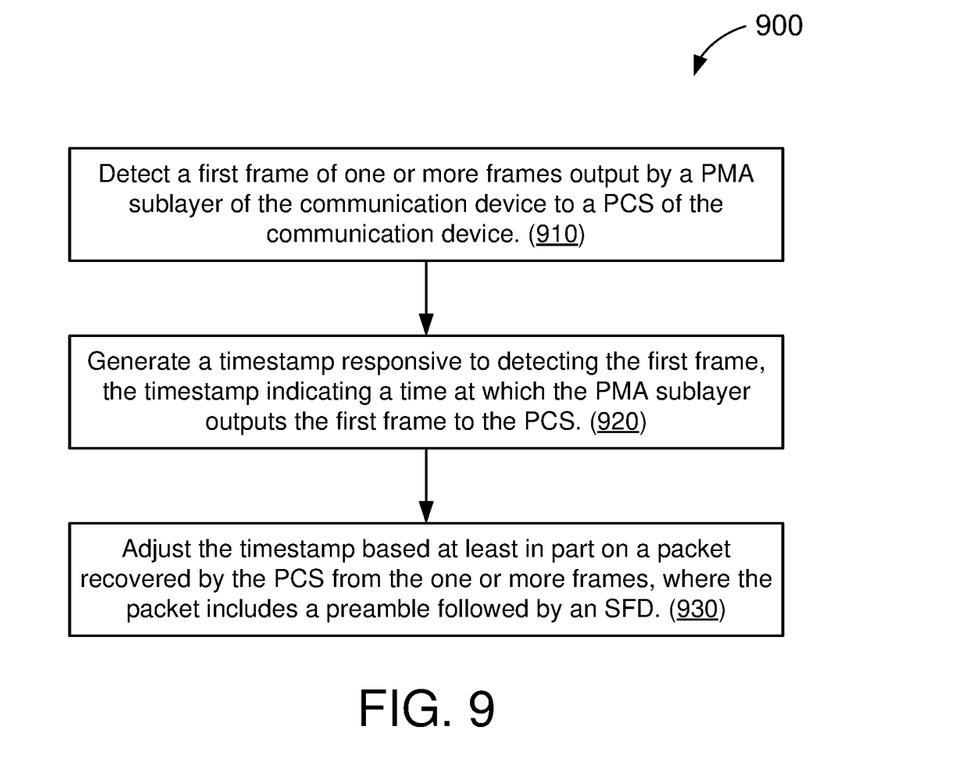
FIG. 9 shows another illustrative flowchart depicting an example operation for timestamping packets, according to some implementations.

FIG. 9 shows another illustrative flowchart depicting an example operation 900 for timestamping packets, according to some implementations. In some implementations, the example operation 900 may be performed by a timing synchronization controller of a communication device such as the timing synchronization controller 700 of FIG. 7.

The timing synchronization controller detects a first frame of one or more frames output by a PMA sublayer of the communication device to a PCS of the communication device (910). The timing synchronization controller generating a timestamp responsive to detecting the first frame, where the timestamp indicates a time at which the PMA sublayer outputs the first frame to the PCS (920). In some aspects, the generating of the timestamp may include recording the time at which the PMA sublayer outputs the one or more frames based on a clock signal associated with the PMA sublayer. The timing synchronization controller adjusts the timestamp based at least in part on a packet recovered by the PCS from the one or more frames, where the packet includes a preamble followed by an SFD (930). In some implementations, the adjusting of the timestamp may include determining an offset between the SFD of the packet and the beginning of the first frame.

In some aspects, the first frame may be demapped from one or more symbols via the PMA sublayer. In some implementations, the timing synchronization controller may further adjust the timestamp based on a delay associated with the demapping of the first frame from the one or more symbols.

In some aspects, the one or more symbols may be buffered in a FIFO associated with an ADC that receives data over a communication medium. In some implementations, the timing synchronization controller may further determine a number of symbols buffered in the FIFO at the time the first frame is output by the PMA sublayer and adjust the timestamp based on the number of symbols buffered in the FIFO. In some implementations, the timing synchronization controller may further determine a clock skew between a clock signal associated with the PMA sublayer and a clock signal associated with the DAC and adjust the timestamp based on the determined clock skew.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for timestamping packets by a timing synchronization controller of a communication device, comprising:
   acquiring timing information indicating a time at which a physical coding sublayer (PCS) of the communication device outputs a first frame to a physical medium attachment (PMA) sublayer of the communication device;
   determining a delay between the first frame and a packet having a preamble followed by a start frame delimiter (SFD);
   generating a timestamp based at least in part on the timing information and the delay between the first frame and the packet; and
   inserting the timestamp into the packet.

2. The method of claim 1, wherein the acquiring of the timing information comprises:
   recording the time at which the PCS outputs the first frame based on a clock signal associated with the PMA sublayer.

3. The method of claim 1, wherein the packet is encoded via the PCS so that the SFD is carried in a second frame, output by the PCS, following the first frame.

4. The method of claim 3, wherein the delay between the first frame and the packet is determined based on a number of frames output by the PCS between the first frame and the second frame.

5. The method of claim 3, wherein the determining of the delay between the first frame and the packet comprises:
   determining an offset between the SFD of the packet and the beginning of the second frame.

6. The method of claim 3, wherein the second frame is mapped to one or more symbols via the PMA sublayer.

7. The method of claim 6, further comprising:
   adjusting the timing information based on a delay associated with the mapping of the second frame to the one or more symbols.

8. The method of claim 6, wherein the one or more symbols are buffered in a first-in first-out buffer (FIFO) associated with a digital-to-analog converter (DAC) that transmits data over a communication medium.

9. The method of claim 8, further comprising:
   determining a number of symbols buffered in the FIFO at the time the first frame is output by the PCS; and
   adjusting the timing information based on the number of symbols buffered in the FIFO.

10. The method of claim 8, further comprising:
    determining a clock skew between a clock signal associated with the PMA sublayer and a clock signal associated with the DAC; and
    adjusting the timing information based on the determined clock skew.

11. A timing synchronization controller for a communication device, comprising:
    a processing system; and
    a memory storing instructions that, when executed by the processing system, cause the timing synchronization controller to:
      acquire timing information indicating a time at which a physical coding sublayer (PCS) of the communication device outputs a first frame to a physical medium attachment (PMA) sublayer of the communication device;
      determine a delay between the first frame and a packet having a preamble followed by a start frame delimiter (SFD);
      generate a timestamp based at least in part on the timing information and the delay between the first frame and the packet; and
      insert the timestamp into the packet.

* * * * *